Figure 35:
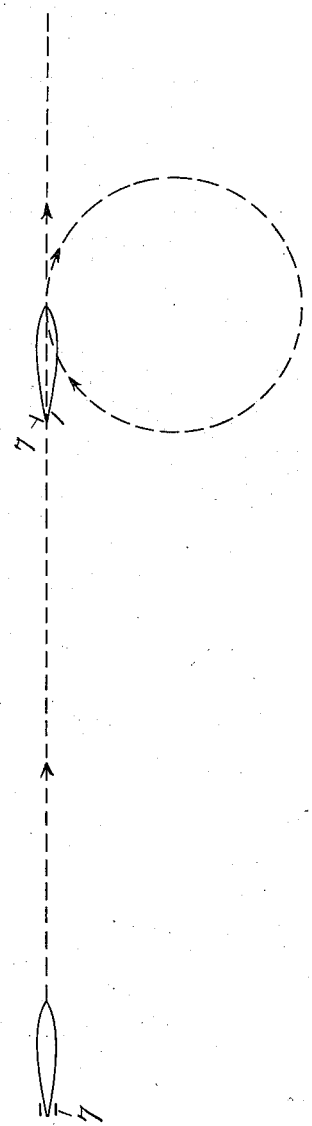

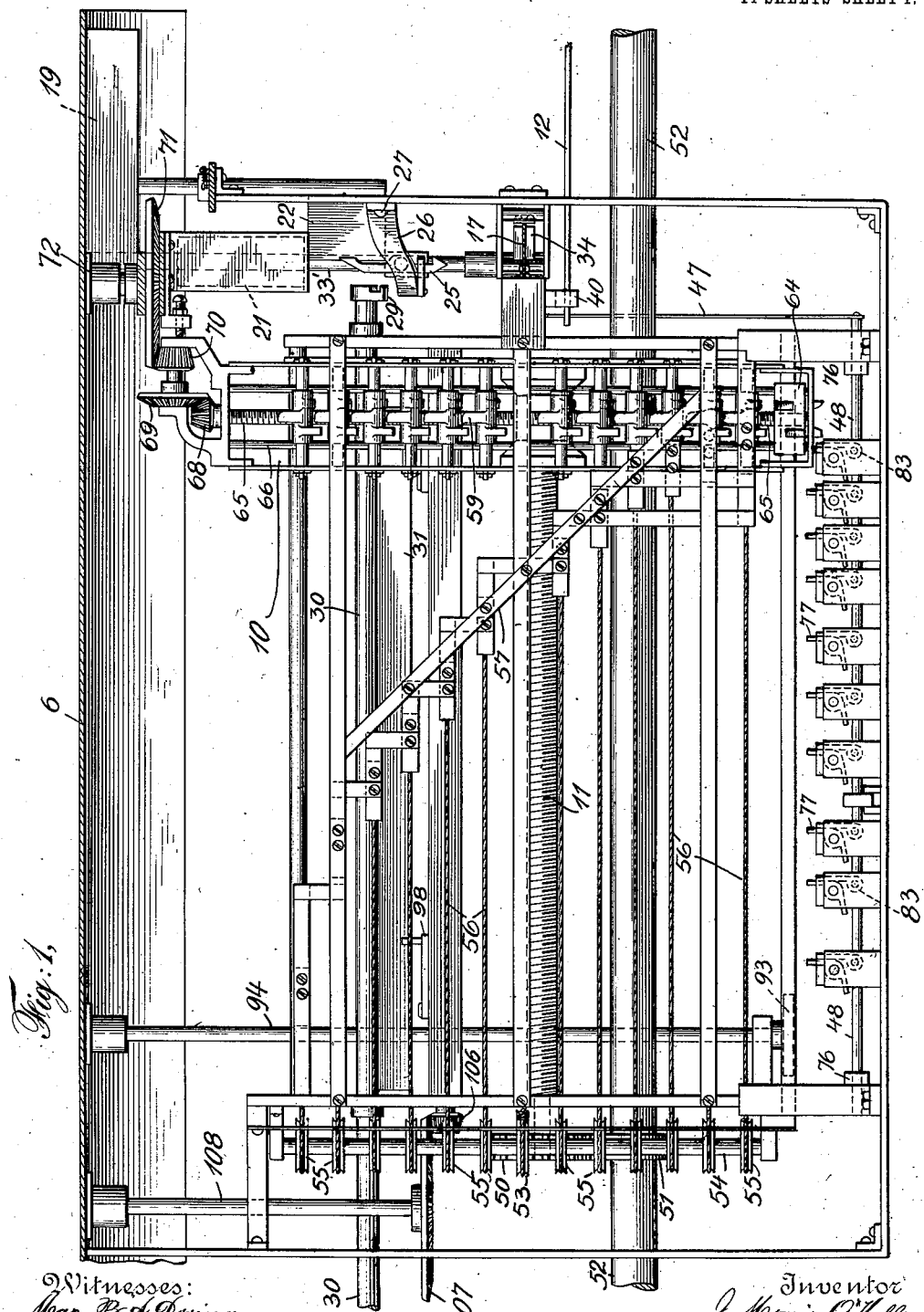

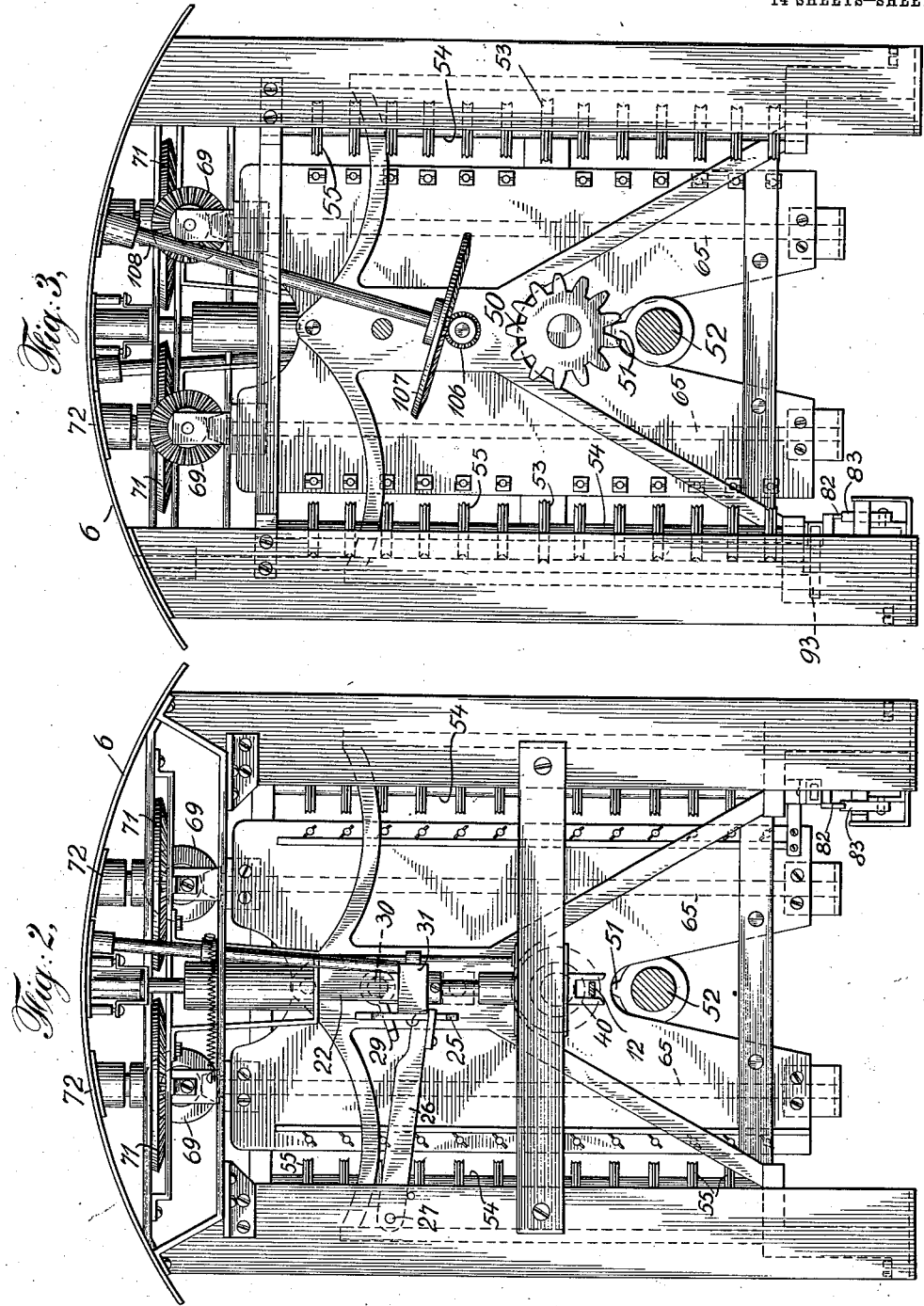

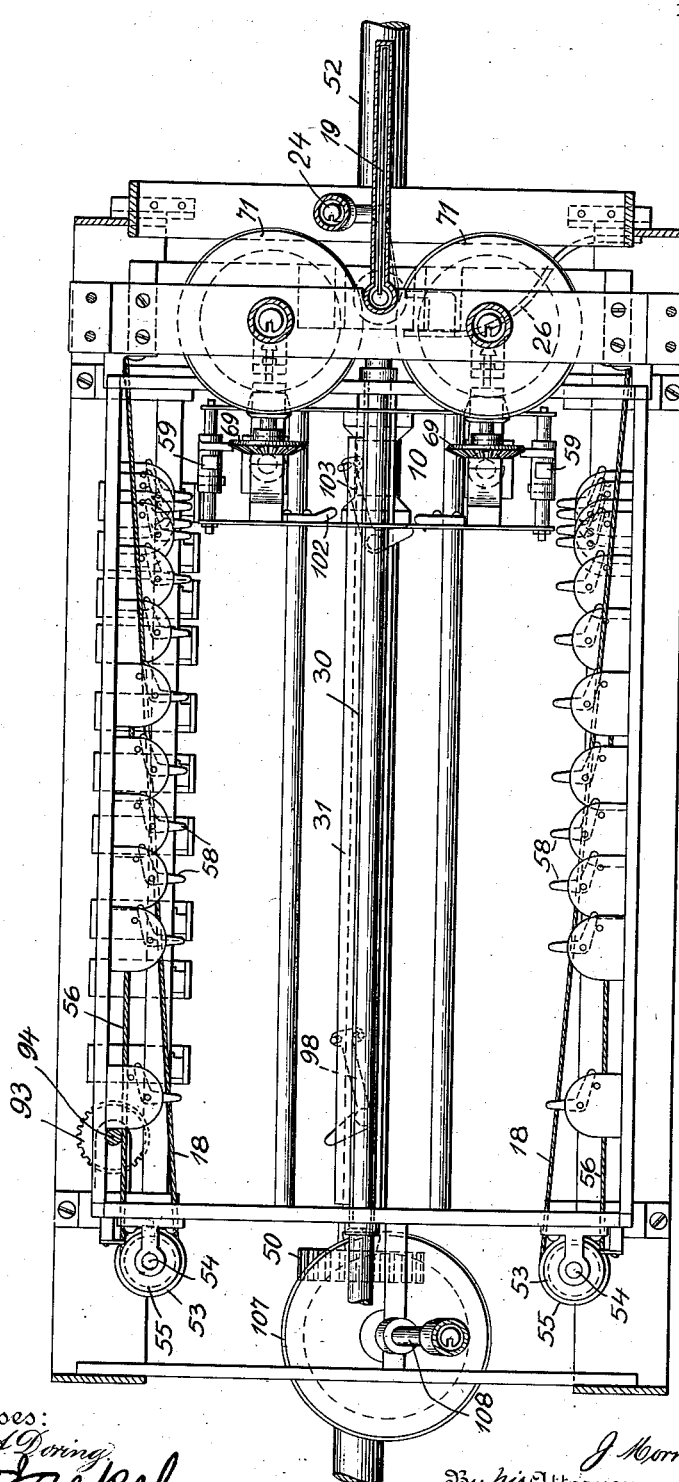

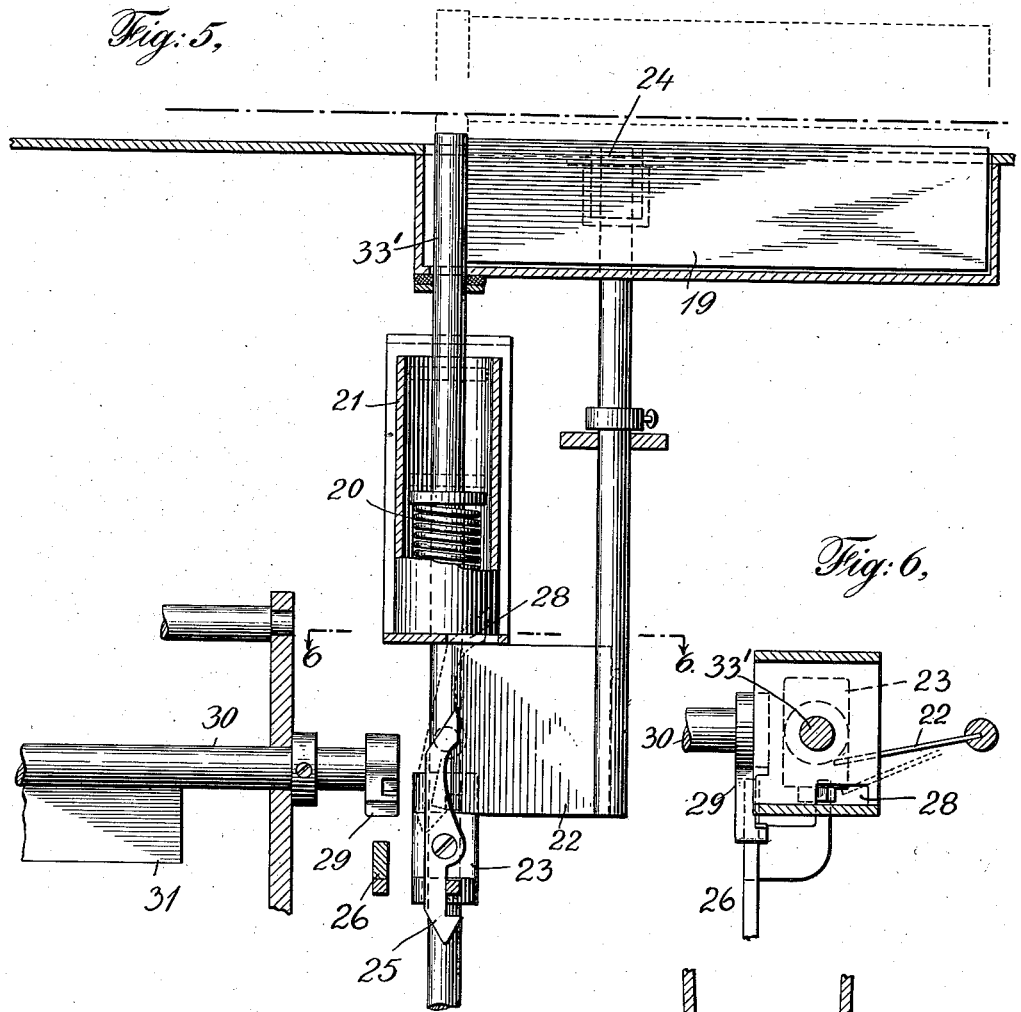

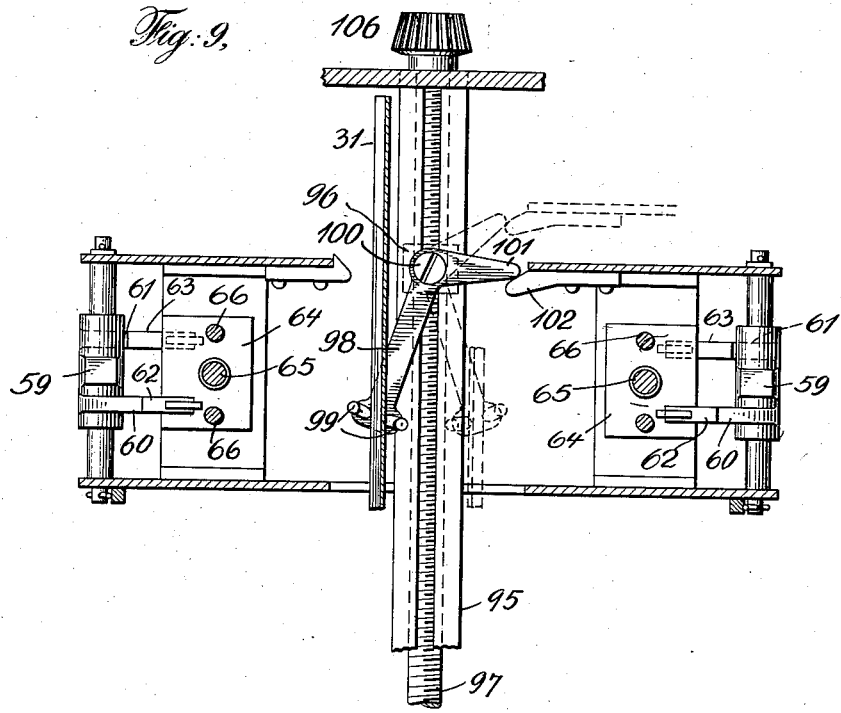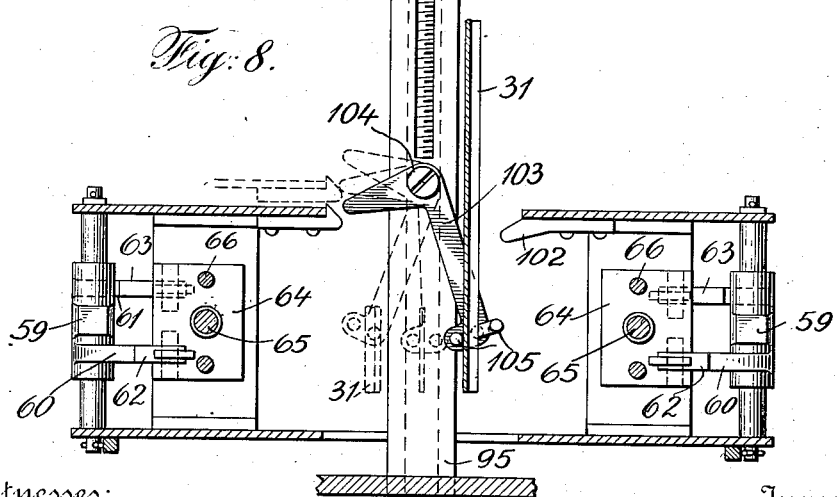

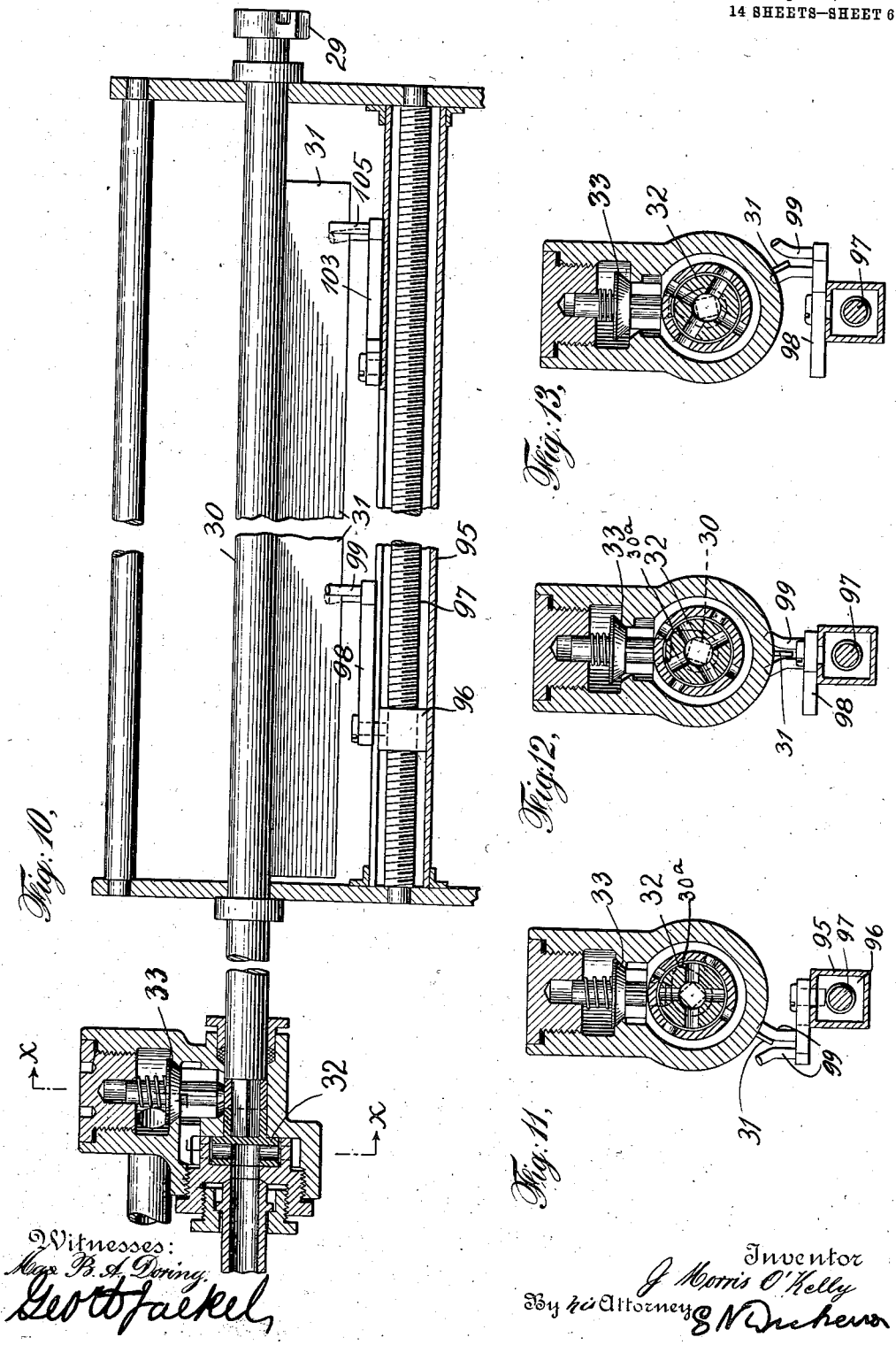

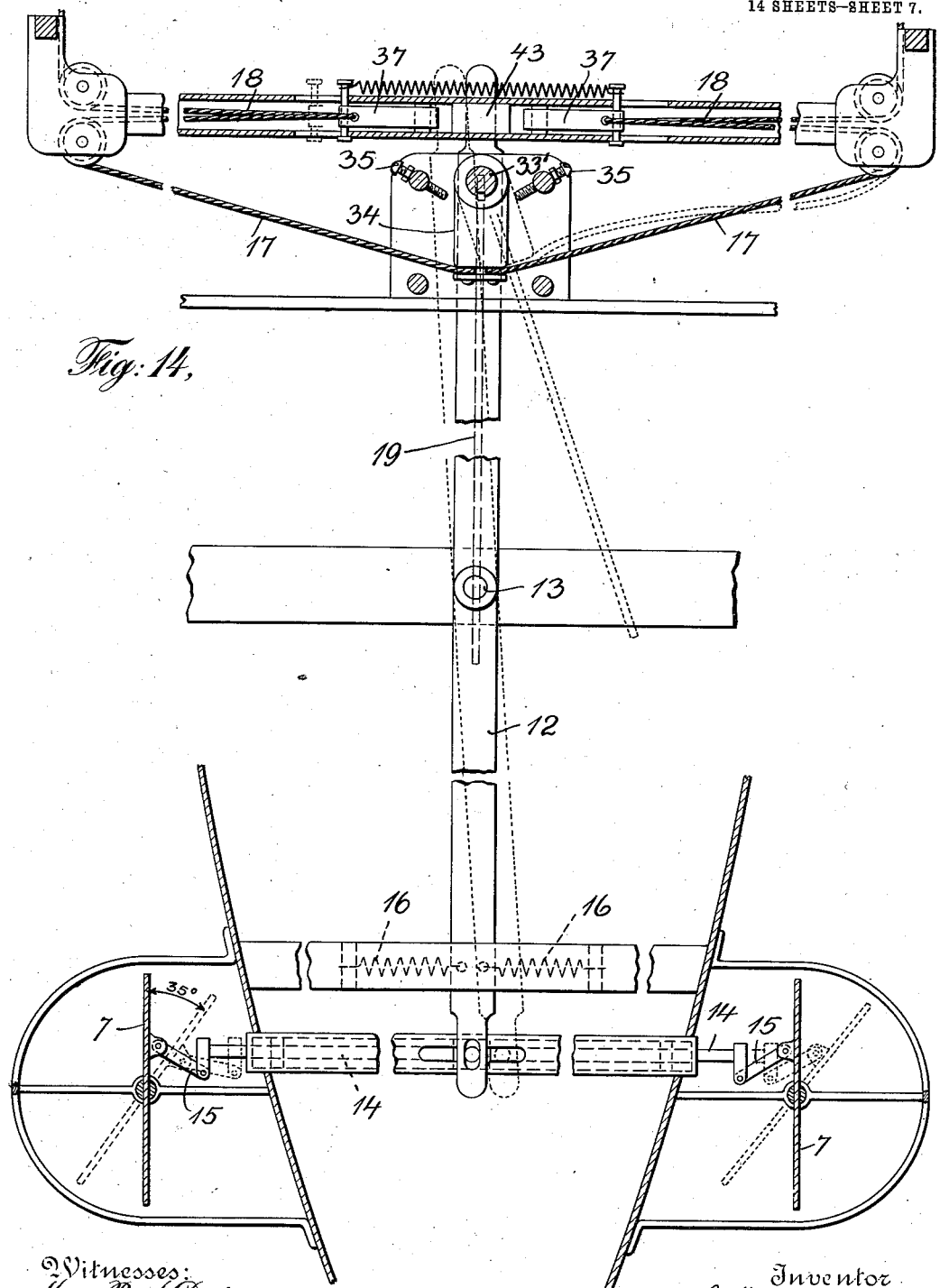

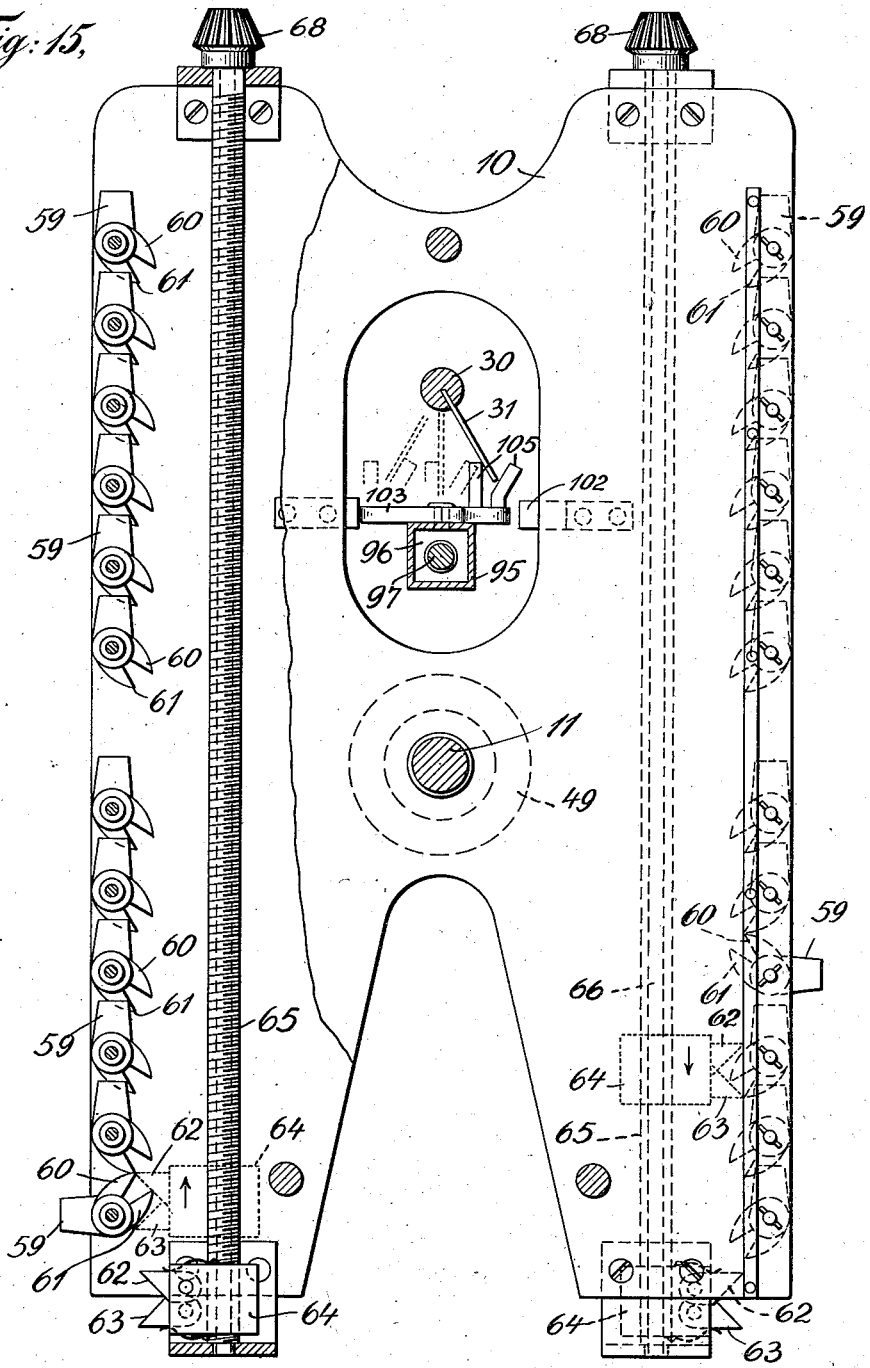

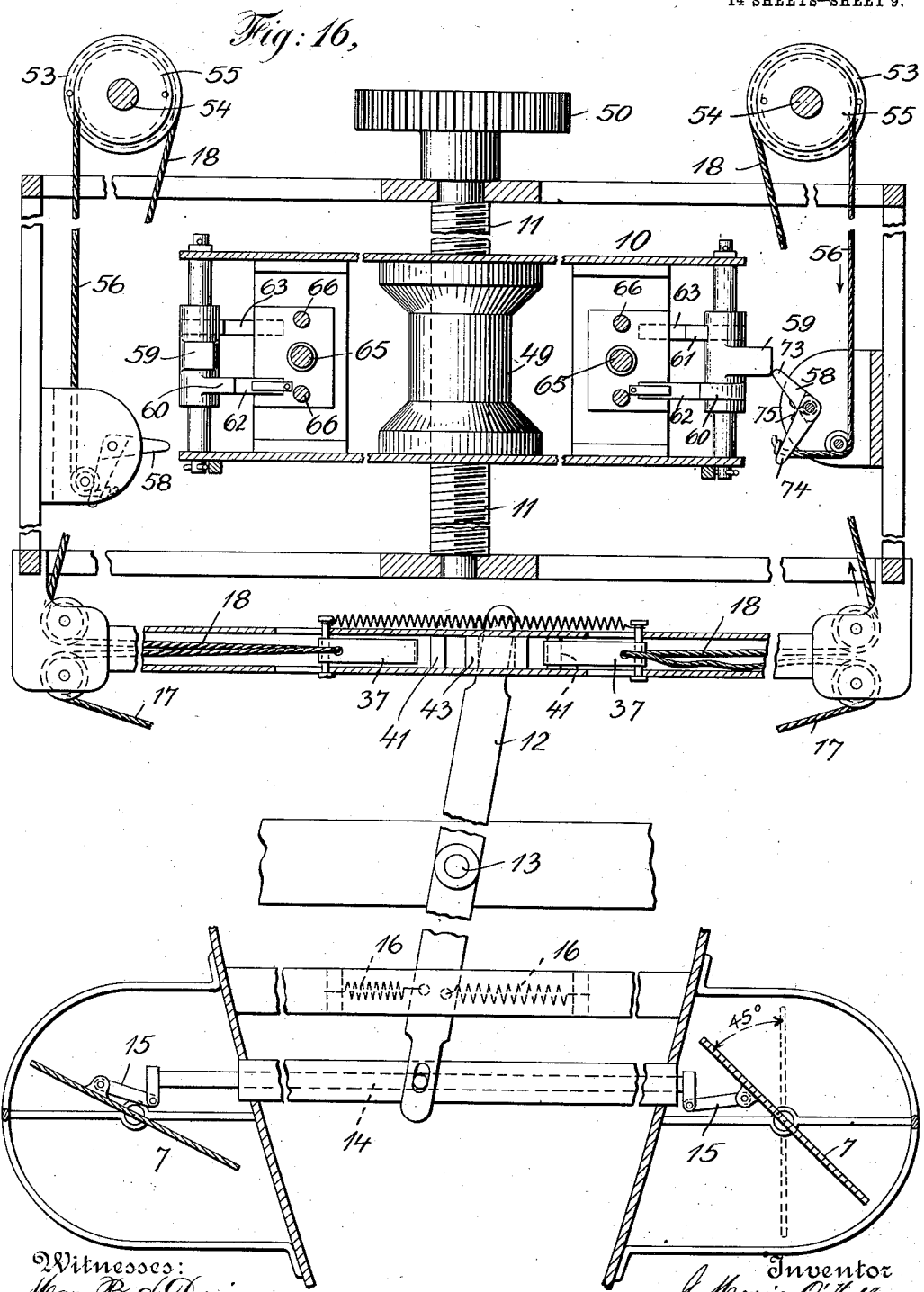

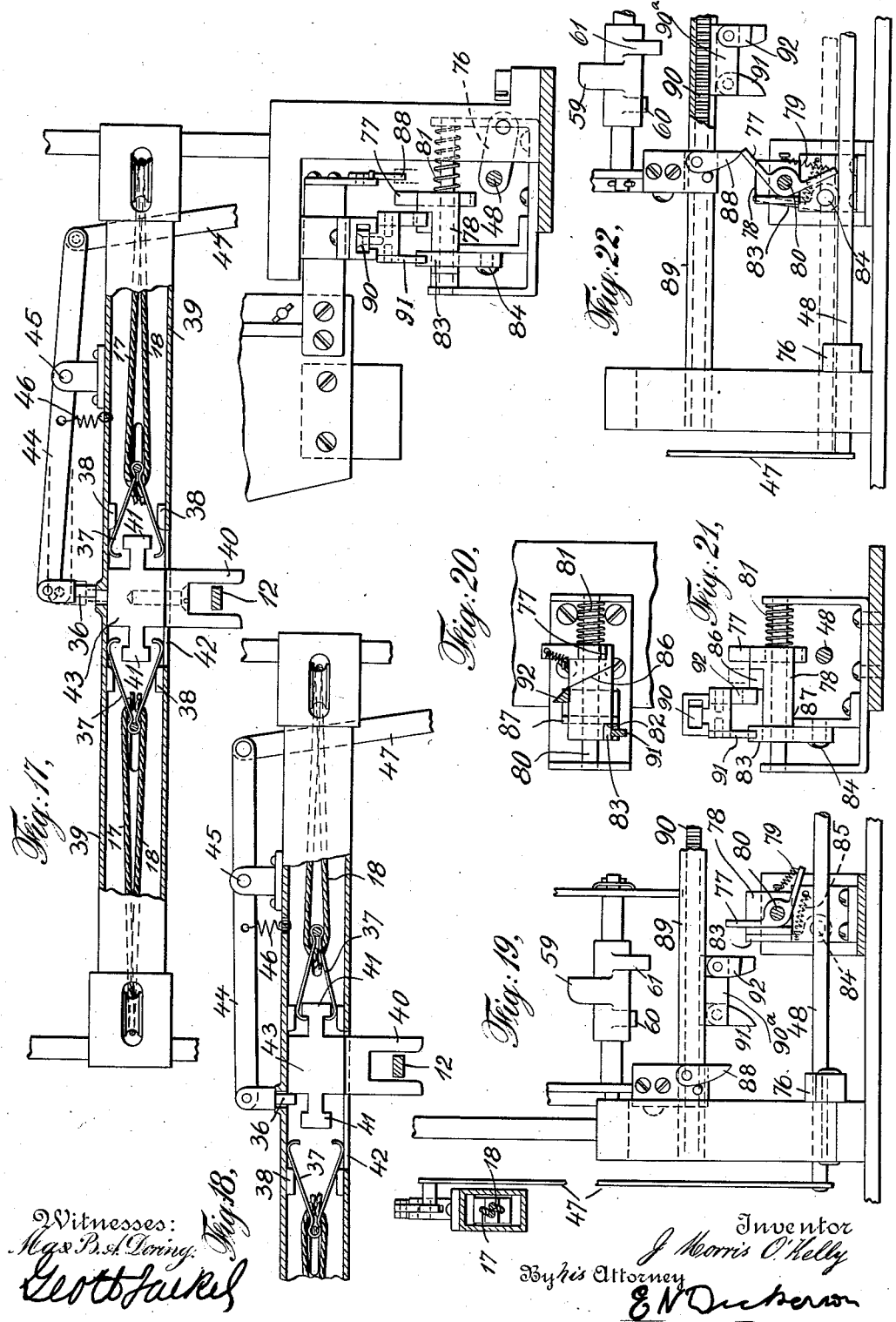

J. M. O'KELLY, DEC'D.
K. O'KELLY, ADMINISTRATRIX.
AUTOMOBILE TORPEDO.
APPLICATION FILED APR. 14, 1909.
998,383.
Patented July 18, 1911.
14 SHEETS—SHEET 11.
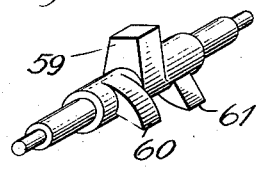
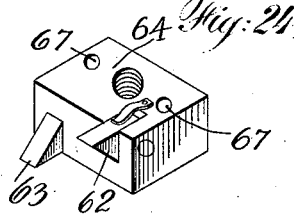
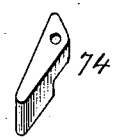
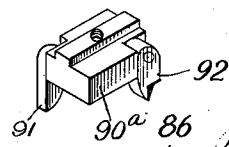
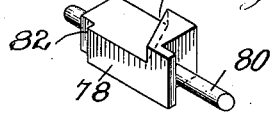
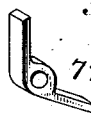
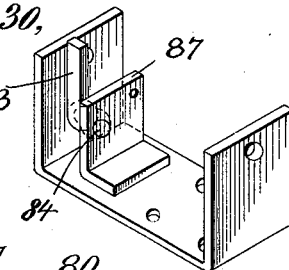
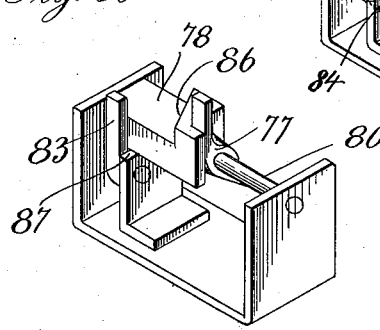
Witnesses:
Max B. A. Doring.
Geott Jackel
Inventor
J. Morris O'Kelly
By his Attorney
E. N. Dickerson

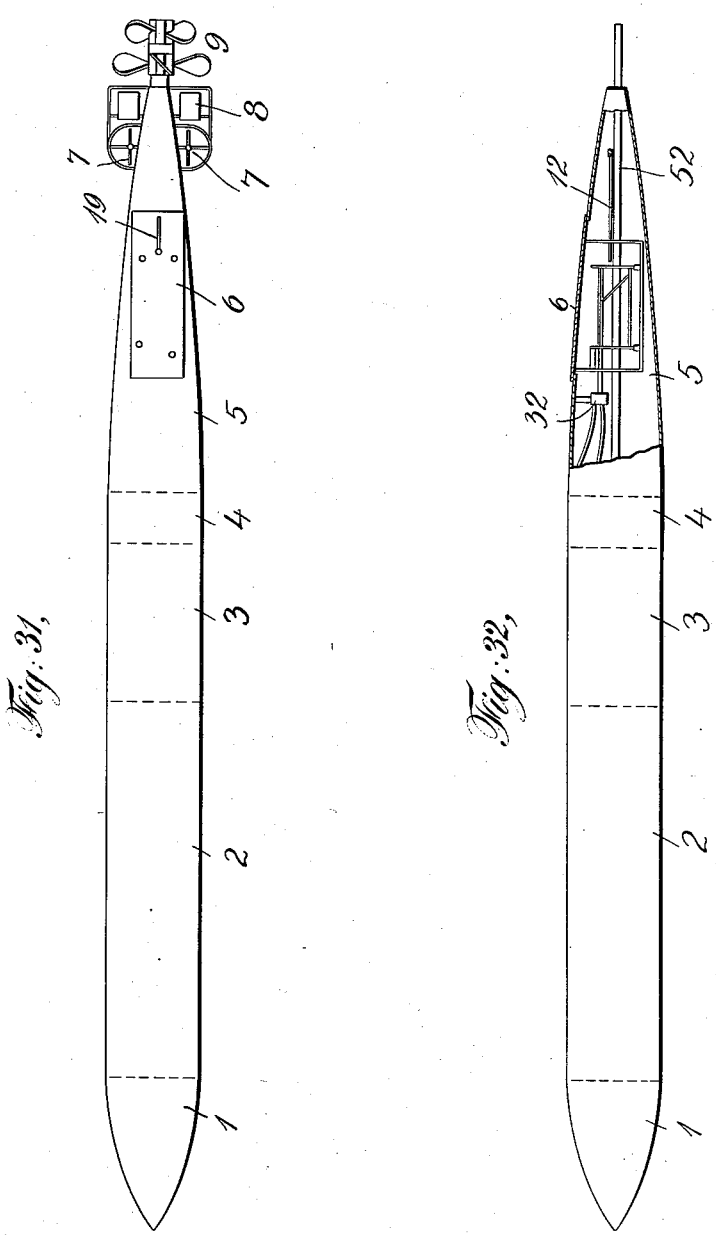

J. M. O'KELLY, DEC'D.
K. O'KELLY, ADMINISTRATRIX.
AUTOMOBILE TORPEDO.
APPLICATION FILED APR. 14, 1909.
998,383.
Patented July 18, 1911.
14 SHEETS—SHEET 13.
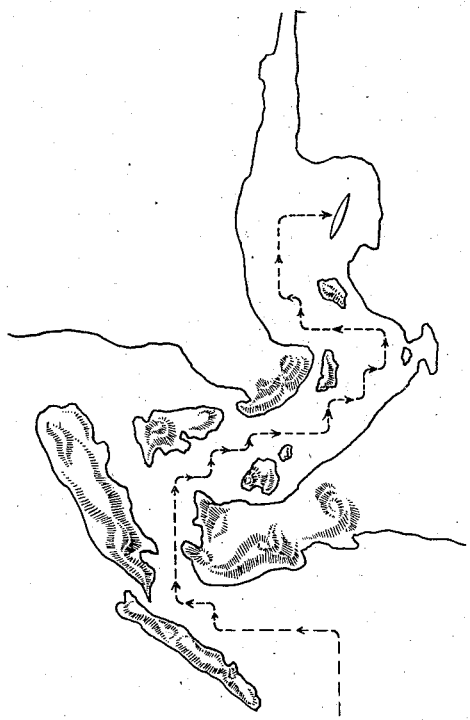
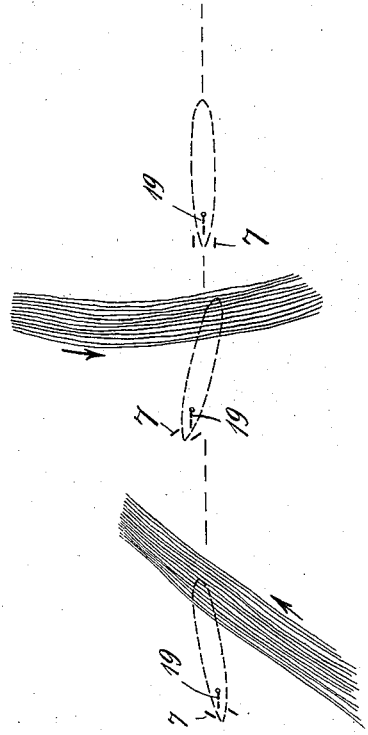
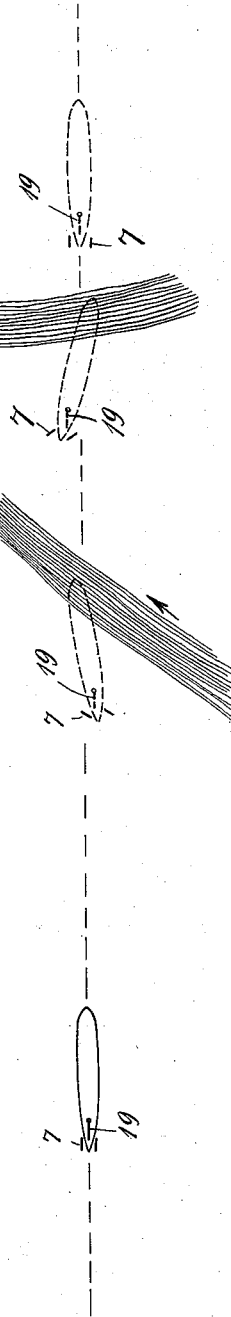
Witnesses:
Inventor
J. Morris O'Kelly
By his Attorney J. M. O'KELLY, DEC'D.
K. O'KELLY, ADMINISTRATRIX.
AUTOMOBILE TORPEDO.
APPLICATION FILED APR. 14, 1909.

998,383.

Patented July 18, 1911.
14 SHEETS—SHEET 14.

Witnesses:
Max B. A. Doring
Geo. B. Jaekel

Inventor
J. Morris O'Kelly
By his Attorney
E. N. Dickerson

UNITED STATES PATENT OFFICE.

J MORRIS O'KELLY, OF NEW YORK, N. Y.; KATHLEEN O'KELLY ADMINISTRATRIX OF SAID J MORRIS O'KELLY, DECEASED.

AUTOMOBILE TORPEDO.

998,383.  Specification of Letters Patent.  Patented July 18, 1911.

Application filed April 14, 1909. Serial No. 489,810.

*To all whom it may concern:*

Be it known that I, J MORRIS O'KELLY, a subject of the King of Great Britain, residing in the city, county, and State of New York, have invented certain new and useful Improvements in Automobile Torpedoes, of which the following is a specification.

This invention relates to an improvement in automatic steering automobile torpedoes. It introduces what I believe to be a new principle in automobile torpedoes; namely, a mechanism by means of which a varying course to starboard or port can be controlled in advance of the run of the torpedo thereby enabling the torpedo to be steered to the right or the left at distances determined in advance for the number of courses which the mechanism of the torpedo is arranged to steer; and, furthermore, the torpedo can be caused to automatically turn on its own tactical diameter and to keep turning at a predetermined point in its range, after which the torpedo can be again directed, if desired, upon its predetermined course. And the said course is further so automatically directed as not to be materially altered or deflected by transverse currents or the usual falling off or laying up of such bodies afloat; meaning thereby that after the vessel has been deflected from its course and the attempt is made to straighten it out upon a new course, such vessel has a tendency to leave such course, but my mechanism will hold it upon the course which has been determined in advance.

It is obvious that my mechanism accomplishes a result which has hitherto been entirely impossible in any automobile torpedoes and approximately corresponds with the action of torpedoes which in some way are steered from their base.

It is obvious that by the mechanism which I have devised, it is possible to attack an object in a harbor, the position of which is known but which is entirely invisible from the attacking point, for the torpedo can be so arranged that it will follow (making due allowance for currents and set) a number of courses for predetermined distances.

In the mechanism shown I have indicated twelve such changes of direction to starboard and twelve to port which is all that would ordinarily be required, but as will be readily seen, any reasonable number of such courses can be arranged to be followed by the torpedo mechanism. The driving, submerging and firing mechanism of the torpedo are of the ordinary type, such as the Whitehead type. Also the starting, delay and stop valves are of the usual type but their control is arranged by means of the governor which I have devised.

The construction and operation of my mechanism will be readily understood from the accompanying drawings, in which similar numbers refer to similar parts, and in which—

Figure 36:
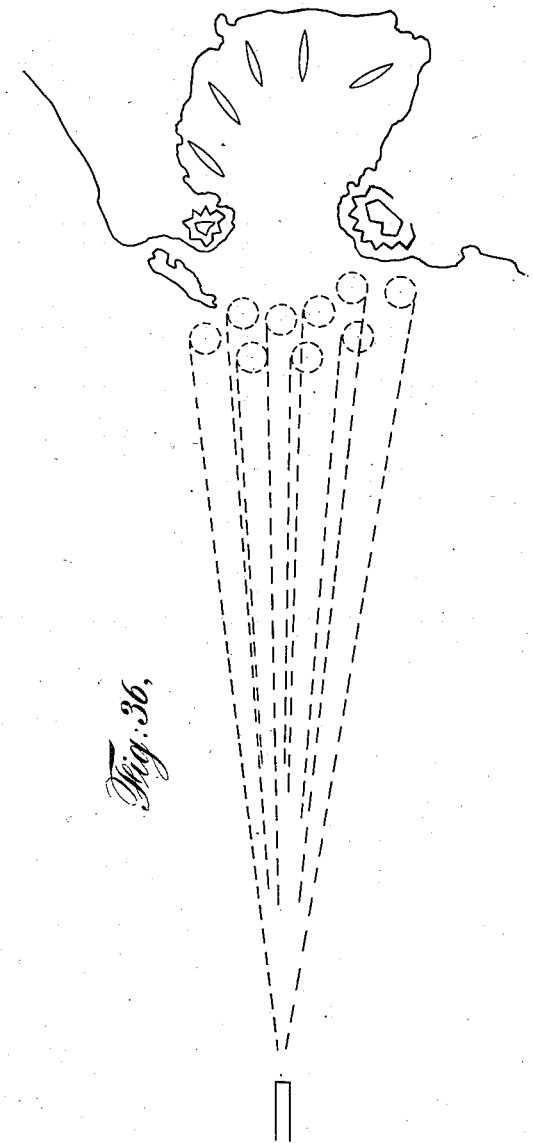

Figure 1 represents a vertical elevation partly in section of my motion box, steering mechanism, and time lock mechanism for fixing the position of the rudder; Fig. 2 represents a vertical elevation of the after end of Fig. 1, showing the setting mechanism for the starboard and port steering mechanism; also the rudder controller and the mechanism for opening the starting valve; Fig. 3, a view of the same mechanism from the opposite or forward side showing the mechanism operating the stop valve and also more clearly the feeding mechanism of the motion box; Fig. 4 represents generally a plan view of the mechanism shown in Fig. 1; Fig. 5 represents a view of the rudder controller and mechanism for putting the same into operation; Fig. 6, a detail of the lower part of the starting valve mechanism and in part of the release mechanism for the controller; Fig. 7, a view at right angles to Fig. 6 of the mechanism for operating the starting valves; Fig. 8, a plan view of the motion box showing its operation upon the delay action valve mechanism; Fig. 9, a view of the motion box showing its action upon the stop valve mechanism; Fig. 10, a longitudinal elevation showing the operation of the starting, delay action and stop valve mechanisms; Figs. 11, 12 and 13 show sectional views upon the line X, X, Fig. 10, of the same valve for the starting, delay action and stop mechanisms in different positions; Fig. 14, a plan view of the perpendicular rudder mechanism showing also the controller and its operation upon the rudders, which rudders are of the usual type; Fig. 15, an end elevation of the mechanism for setting the throwing arms of the motion box which affect the steering mechanism and showing also the three positions of the valve mechanism for starting, delay action and stopping; Fig. 16, a plan of the motion box showing the spool nut for moving it and part of the steering mechanism in operation throwing the rudder to an angle of forty-five degrees; Fig. 17, a detail elevation of the mechanism for throwing the rudder to starboard and port and locking it when thrown in either position; Fig. 18, an elevation partly in section of the same mechanism showing it in operation as throwing the rudder to starboard; Fig. 19, an elevation of the time lock setting mechanism for determining the point of release of the rudder when set to starboard or port; Fig. 20, a plan view of one of the time locks; Fig. 21, an elevation of the same; Fig. 22 shows an elevation of the mechanism for releasing the time lock in operation, at the distance set; Fig. 23 shows a detail of the tripping mechanism shown in Fig. 15; Fig. 24, a perspective view of the toes for operating the tripping mechanism shown in Fig. 23; Figs. 25 and 26 are perspective views of the projecting toes shown in Fig. 4; Figs. 27, 28, 29, 30 and 30ª are details of the mechanism of the time locks; Fig. 31 is an exterior plan view of a torpedo showing my controller in position in the buoyancy chamber; Fig. 32, a view at right angles to Fig. 31, partly in section; Fig. 33 represents the operation parts being shown in section or motion of my torpedo pursuing 20 courses and striking a ship within an inaccessible harbor which may be strongly defended by fortifications; Fig. 34 represents the operation of my torpedo and its controlling mechanism when affected by transverse currents; Fig. 35 represents the operation of my torpedo operating on its own tactical diameter at a predetermined distance and then following a determined course; and Fig. 36 represents a view of the effect of the operation of nine similar torpedoes turning in circles on their own tactical diameter at the opening of a harbor and thereby blockading a port so that an outcoming ship or fleet would strike against them and be sunk.

The main mechanism of my torpedo consists of means by which a course can be set at a predetermined distance from the point of departure, which course may be either to port or to starboard at right angles to the previous course, and mechanism by means of which any number of subsequent courses within the capacity of the machine can be similarly set. It furthermore consists of mechanism which I call the controlling mechanism, by means of which the course can be automatically held in its predetermined direction, notwithstanding the influence of cross currents. It further consists in mechanism operating in conjunction with the steering mechanism by means of which the rudder can be held to starboard or port for a predetermined length of run, thereby causing the torpedo to turn on its tactical diameter. In connection with the previously described mechanism, there is further mechanism for operating the starting, delay action and stop valves of the torpedo.

My torpedo is externally represented in Figs. 31 and 32 in which 1 represents the warhead, 2, the air flask, 3, the balance chamber mechanism, 4, the engine room, 5, the buoyancy chamber, 6, the controller plate through which my controlling vane or controller operates, 7, the perpendicular rudders controlled by my mechanism, 8, the horizontal rudders controlled as usual by the mechanism of the balance chamber and 9, the propellers revolving in opposite directions as usual. It is obvious that the ordinary details such as the whiskers, pistol and striker are not shown. The important operative part of my mechanism is what I call the motion box generally represented by 10, of which a separate view is found in Fig. 15. This motion box consists of a longitudinally moving frame carrying various mechanisms for accomplishing the purposes of my invention. It is moved longitudinally by means of a screw 11, having a determined pitch. The primary object of this moving frame is to operate the vertical rudders 7 moving the same to starboard or port as occasion may require. The rudder mechanism is principally shown in Figs. 4, 14 and 16. The rudder 7, which is preferably of the balanced type, can be swung to starboard or port, as shown in Figs. 14 and 16. The rudder, as previously explained, is capable of independent control by two mechanisms, one the motion box and the other the controller, both operating, however, through the same tiller. The importance of this interrelation between the two mechanisms affecting the rudder is largely so that, after the torpedo has been brought to a determined course by the action of the motion box, it will be compelled thereafter to keep that course by the action of the controller, there being otherwise, a tendency of a vessel when brought to her course to fall off or come up from that course. For reasons to be hereafter explained, however, the controller mechanism throws the rudder to a less angle, say thirty-five degrees, than does the motion box which can throw the rudder to say forty-five degrees, as shown in Figs. 14 and 16.

The tiller 12, pivoted at 13, operates the rudder by means of the sliding rod 14 having direct connection with the rudders through the pivoted rods 15, the operation of which will be self-evident to any mechanic. The tiller is shown as brought to a central position by means of the tiller springs 16. The tiller is controlled by two pairs of tiller ropes 17 and 18, the ropes 18 being operated by the motion box in a manner to be hereafter described and the ropes 17 being operated by the controller. The controller has a pivoted vane 19, shown in Fig. 5 and in plan view in Fig. 14. When the torpedo is at rest, it is in the position shown in Fig. 5 within the shell of the torpedo. A controller spring 20 operating against a collar on the stem of the controller in the spring chamber 21, tends to throw the controller into the position shown in dotted lines in Fig. 5, whereupon it becomes operative. The spring 20 is prevented from operating by reason of the locking arm 22, which normally engages against the collar 23 and is under the bottom of the spring chamber 21. If this arm 22 is turned to release the collar 23, then the spring 20 tends to throw the controller vane upward, which controller vane is secured on the controller shaft 33', because the arm 22 no longer bears against the collar 23. The release of this collar is effected by a key passing through the skin of the torpedo into the keyed socket shown at 24. The release of the controller is done when the torpedo is entered into the torpedo tube as far as the controller shaft 33'; when the service handle is moved to the left the upper part of the controller shaft 33' is resting against the inner surface of the tube. The controller consequently is not allowed to spring out until it is free of the tube.

In the upward position the collar 23 bears against the bottom of the spring case 21 and prevents the further motion of the controller. As the controller springs upward, it moves with it the hook piece 25. This hook piece 25 engages with the valve operating arm 26, pivoted at 27. When the controller springs upward it moves the arm 26 into the position shown in dotted lines in Fig. 7. Then the upper end of the hook piece 25, which is beveled, strikes in the chamber 28, which is at the bottom of the spring chamber 21, and is thereby deflected into the position shown in dotted lines in Fig. 5 and consequently releases the pivoted arm 26. When released the arm 26 falls back to its normal position, leaving, however, the valve presently to be described in the position to which it has moved it. This position is shown in Fig. 12. The arm 26 in its upward motion, comes in contact with the toe 29 throwing it into the position shown in dotted lines in Fig. 7. This toe is attached to the valve shaft 30 which carries the valve wing 31, shown in Fig. 10. This shaft is operative in three positions, as shown in Fig. 15, to bring the starting valve into three operations, the first of which enables the propeller to revolve comparatively slowly, the second of which turns on the full power to the reduction valve of the engine and the third closes the stop valve of the engine. These positions of the controlling valve 32, which is the ordinary mechanism of the torpedo, are shown in Figs. 11, 12 and 13. Fig. 11 shows the valve closed, Fig. 12 partly open and Fig. 13 full open. The operation of this valve is two-fold in the ordinary way; that is, the arms of the rotary valve 32, come into the different positions shown and the independent valve 33 is more or less raised from its seat by the action of the toe or cam 30ᵃ on the valve shaft 30. These operations are, however, the usual ones in a Whitehead torpedo and do not need further description. The lower end of the controller shaft 33' has an arm 34 into which the tiller ropes 17 are made fast. These pass over pulleys in the ordinary way as shown and control the tiller, as may be plainly seen in Figs. 14 and 16. The radial movement of this arm 34 can be regulated by the screws 35, thereby preventing the swing of this arm through a greater arc than has been determined, which arc, as shown in the drawing Fig. 14, should not move the rudder more than thirty-five degrees. The purpose of this is to prevent operation of the locking mechanism of the rudder, which is shown by the bolt 36, Fig. 17, falling into place, so as to prevent the operation of the controller. The tiller ropes are not directly fastened to the end of the tiller but operate through a frame shown in Figs. 14, 16, 17 and 18. Both the starboard and port tiller ropes are provided with spring clamping jaws 37, which normally tend to spring open but which, in their operation, can be closed by the spring closing lugs 38. These spring jaws 37 are drawn longitudinally through the tubes 39 which are shown as square and are moved transversely of the axis of the vessel for the purpose of steering. They are shown in their normal position in Fig. 17 in which the tiller is free and amidships. This tiller 12 rests between the forked arms 40 of a sliding piece provided with cross lugs 41 with which the spring jaws 37 engage, as will be clearly seen in Fig. 18. By drawing either of the tiller ropes 17 or 18 the spring is caused to close seizing the lug and moving the arms 40 which straddle the tiller 12 toward the end of the slot 42. If the block 43 carrying the arms 40 and the lugs 41, is moved to the right to the distance shown in Fig. 18, a pin 36 carried on the arm 44 pivoted at 45, may drop in behind it and of course will operate similarly if the sliding block 43 is pulled to the left. The purpose of this pin is to enable the time locks hereafter to be described to cause the torpedo to circle for a predetermined distance and if it is not intended to have the torpedo circle, the pin 36 is put out of operation and this part of the mechanism becomes ineffective. This is done very simply by lifting the arm 44 until the pin passes out of the hole in the box 39 and then the pin is shifted to one side of the box so that the pin can rest upon the outer surface of the box. It, of course, can be put into operation again by simply putting it back into its hole or socket. It is obvious that this operation will cause the helm to be locked to starboard or port as the case may be until the pin is released. The pin is held in its locking position by the spring 46. The other end of the locking lever 44 is pivoted to the connecting arm 47 which is in turn pivoted to the longitudinal shaft 48, Fig. 1, which can be depressed and released by the operation of the motion box, as will be hereafter described, thereby causing the rudder to be locked to starboard or port for a predetermined number of revolutions of the main shaft of the engine. It will now be obvious that the adjusting screws 35, Fig. 14, must be so set as to prevent the motion of the sliding block 43 to such a point that the pin 36 will fall behind it and lock it.

I will now describe the operation of the automatic steering mechanism.

The motion box 10 is longitudinally moved by means of the spool nut 49 operating on screw 11, Fig. 16. The screw 11 is moved by the spur wheel 50, which is in turn moved by the tooth 51 on the main shaft 52. As shown in the drawing Fig. 3, the spur wheel 50 has thirteen teeth and at each revolution of the main driving shaft 52 the spur wheel is advanced one tooth. The main feeding screw of the motion box has 16 threads to the inch. Of course these exact numbers are not essential but they work out for an easy regulation of the distances and courses, as will be hereinafter shown. They can be altered to increase or reduce the range of the torpedo with reference to the mechanism I am about to describe. The main tiller ropes 18 pass around the pulleys 53 mounted on vertical shafts 54, Fig. 1. The rotation of one or the other of these shafts will plainly throw the helm to starboard or port. Each of these vertical shafts 54 is provided as shown with twelve other pulleys 55 which, as shown, have a less diameter than the main pulley 53. Around each of these pulleys pass ropes 56 which, when pulled, will cause the vertical shaft 54 to revolve, thereby shifting the rudder by winding the tiller ropes upon the pulleys 53. There are two sets of these pulleys for starboard and port, as can be plainly seen in Figs. 2 and 3. The ropes 56 have their ends fastened to tripping apparatus in the angular frame 57. There are two of these frames representing the two sets of ropes and each carries, as shown, twelve tripping devices which are in place, one above the other, with reference to the movement of the motion box but each is placed farther along in the line of motion of the motion box than is the one below it so that the motion box operates each of these tripping devices in succession provided such device is set to be operated. The tripping device consists of two portions; one, the fixed parts on the angular frame 57, and the other the tripping toes on the motion box. The parts fixed are generally bell crank levers 58, Fig. 16, which are normally in the position shown in dotted lines on the left of Fig. 16 but which can be thrown into operative position by the movement of the motion box, thereby moving the rudder as shown on the right of Fig. 16. The bell crank levers 58 are operated by means of the toes 59 which correspond to the twelve courses to starboard and port and any one of which may be set in advance so as to operate the rudder by mechanism presently to be described. This bell crank lever 58 is not solid but is made in two pieces 73 and 74, as shown in Figs. 25 and 26. They are pivoted through the holes as shown in their operative position on the right of Fig. 16. A spring 75 holds them open but the arms may close together to allow the motion of the motion box without engaging these bell crank levers. In Fig. 16 the toe 59 is shown on the right in its operative position and on the left it is shown out of action. The toe 59, the detail of which is seen in Fig. 23, is mounted upon a pivoted shaft having two independent cams or toes 60 and 61, the toe 60 being used to throw the tripping toe 59 into operative position and the toe 61 to release it. The toes 60 and 61 are set and released by means of the set block 64 having setting and releasing toes 62 and 63, Fig. 24. Both the toes 62 and 63 are pivoted like the pawl of a ratchet so as to pass freely in one direction or motion and lock in the opposite direction as will be easily seen. The setting block 64, Fig. 15, is screw threaded and suitably mounted upon the screw 65, being prevented from revolving by guide rods 66, Fig. 1, passing through the guide openings 67 in the block 64, Fig. 24. The screw 65 is operated through the miter gears 68, 69, which are in turn operated by the miter gears 70, 71, which miter gears 71 are operated by means of keys inserted through watertight key openings 72, in the body of the torpedo. It is, of course, to be understood that these parts are in duplicate for the starboard and port setting. The operation of this setting mechanism can now be understood. Supposing it to be desired to set the first course to port and the fourth to starboard, as shown in Fig. 15, in that case the port screw 65 is operated by the key, a determined number of revolutions thereby raising the setting toe 62 into the position shown in dotted lines on the left of Fig. 15. This motion throws the tripping toe 59 down into the position shown in Fig. 15 on the left of the drawing. If the apparatus is left in this position, it is plain that as the motion box advances in the operation of the torpedo, the pulley carrying the rope for the first course on the port side will be operated for the length of time which is required for the bell crank lever 58 to slip by the setting toe 59. This time is so determined by the interrelation of the parts as to cause the torpedo to change its course ninety degrees before the bell crank lever is out of engagement and the torpedo resumes its straight course. It is obvious that the time of this action is determined by the operative width of the toe 59. If, however, it is desired to set the fourth course to starboard, as shown in Fig. 15, on the right, in that case the starboard key is turned the necessary number of turns to put the first operative toe in position and the crank is then turned in the opposite direction a sufficient number of turns to replace it in its original position which can be done by the action on the release toe 63 without again bringing the setting toe 62 into engagement. Again by moving the block 64 upward, the second and third toes can be set and then by moving the block in the reverse direction the second toe can be released leaving the third one set. Again by a further motion, the fourth toe can be set, the third toe having already been set, and by the reverse motion, as shown on the right of Fig. 15, the third toe can be released leaving the fourth toe set. The condition of affairs, therefore, as shown in Fig. 15, shows the first course to port and the fourth course to starboard set. If desired, the apparatus could be left in its present condition but it is better practice to continue the upward motion of each block setting and releasing each toe until the blocks have reached the limit of their upward motion. It is, of course, obvious from this description that any or all of the starboard and port toes can be set but of course toes of similar numbers on the port and starboard side cannot be simultaneously set, for the torpedo cannot be steered both ways at once. The number of turns of the setting key required to set each toe is determined by a range table accompanying the torpedo so that the torpedo officer knows that a certain number of turns, say three and one-half, will set the fourth course to starboard, and in the mechanism as shown one reverse turn from the point of setting releases the previously set toe. The time locks which affect the action of the rudder when thrown by the motion box, are also released by said motion box.

As has been previously explained, after the pin 36 has fallen into position back of the sliding tiller block 43, it will remain there until connecting arm 47 has been pulled down. This is pulled down by the radial motion of the shaft 48 which shaft is pivoted upon two arms 76. In Fig. 22, the shaft 48 is shown in dotted lines in its upper position and in full lines in its lower position. This shaft is lowered by the action of any one of ten bell crank levers 77, Fig. 29. This bell crank lever 77 is pivoted upon the end of a shaft of the cam block 78 and is held in its vertical position, as shown in Fig. 19, by bell crank spring 79 but can be moved around its axis which is the cam block shaft 80 thus extending the spring as shown in Fig. 22. The cam block is normally held in position toward the motion box or toward the center of the torpedo by means of spring 81, Fig. 20, but this motion is arrested by the engagement of a shoulder 82 against the cam block releasing bell crank 83, the detail of which is shown in Figs. 20, 21, 30 and 30ᵃ. This bell crank is pivoted at one end as at 84 and is moved into its operative position by spring 85, Fig. 19. The cam block which has the cam or inclined plane surface 86 upon its upper face, is prevented from revolution by suitable track surfaces 87. If the releasing bell crank 83 is depressed or moved laterally from the cam block, then the cam block will be forced inward by the spring 81, as shown in Figs. 17 and 22. If, however, the cam surface 86 is acted upon by a body moving across its surface the cam block will be forced outward into the position shown in Fig. 22, and the spring 81 will thereby be compressed. In that position the bell crank 77 comes into engagement with the pawl 88 which is pivoted to the motion box at its after end. Under these circumstances, the lower end of the bell crank 77 engages with the shaft 48, shown in Fig. 22, depresses the same and releases the bolt 36 and the tiller sliding block 43 which thereupon goes to its neutral position. The method of setting any one of the cam blocks is, generally speaking, similar to the method of setting the toes 59 previously described. A block 90ᵃ is mounted upon the rack rod 90 and is longitudinally movable therewith. It carries two pivoted pawls 91 and 92 for releasing and setting the cam block. The pawl 92 has an inclined surface which engages with the cam of the cam block, whereas the pawl 91 when operated in the reverse direction engages with the upper end of the lug of the bell crank 83, trips the same and releases the cam block. The pawls 91, 92, which are carried by the rack project through a slot in the bottom of the rack box 89 and the rack itself is longitudinally movable through this box by means of the gear wheel 93 operated through the keyed shaft 94, Fig. 1.

By revolving the spur gear, the block 90ᵃ can be moved longitudinally along the time locks. By moving it over the first time lock, that one is set and by a reverse movement it is released and so on with all of the others until the desired one is set and left in that condition. If then a course has been set by the motion frame and the time locks are arranged to be operative, the torpedo will circle on its tactical diameter until the motion frame reaches the time lock which has been set to release the rudder, which time lock release may be at any determined distance subsequent to the setting of the course; that is, assuming the course to have been set at one thousand yards the torpedo will, under these conditions, continue turning on its tactical diameter until the pawl 88 on the motion frame strikes the arm 77 of the bell crank, depresses the shaft 48 and releases the rudder which will therefore be again in control of the steering apparatuses, the motion frame and the controller. When, however, it is desired to stop the torpedo after a certain course, I then bring into operation the stop mechanism of the motion frame which is shown in Figs. 8 and 9 which show also the operation of the motion frame on the delay action valve. As previously described, the shaft 30 is controlled by the wing 31 into three positions, Fig. 15, of which the middle position in dotted lines starts the air valve in the torpedo. In the position on the left it is shown open and in the position in full lines on the right, it is closed. I have already described the initial operation of release when the controller throws the shaft in the position to open the starting valve, that is, the central position shown in Fig. 15. Extending through the motion frame and parallel with its axis of movement is a box 95. Within this box is a square block 96 which travels within the slotted box 95 and is moved therein by means of the screw 97. This box carries the arrest lever 98 which has two pins 99 which straddle the vane 31. This arrest lever is pivoted at 100 and its toe 101 comes in contact with the lug 102 of the motion box and in so doing the lever 98 is swung from the position shown in full lines in Fig. 9 to the position shown in dotted lines, thereby throwing the vane 31 into the position for closing the stop valve and shutting off the power to the reduction valve and engines. On the other end of the box 95 is fixed a similar lever 103 which is also pivoted at 104 but its pivotal position is permanent. This lever straddles the vane also by pins 105 and by the movement of the motion box is moved from the position shown in full lines in Fig. 8 to the position shown in dotted lines thereby swinging the vane into the position to open the air or delay action valve full. The position of the arrest lever 98 with reference to the position of the motion box is, of course, determined by the positions of the block 96 in the box 95. This block is longitudinally moved by the screw 97 which is turned by the miter gear 106 which is in turn revolved by the corresponding miter gear 107 turned by the keyed shaft 108, Fig. 4. The mathematical relations of this miter gear, screws, etc., are of course determined in advance so that a definite number of turns of the shaft 108 will determine the length of run of the torpedo before the stop valve is closed and the air shut off from the reduction valve and the engines.

From the foregoing description the operation of my torpedo can be readily understood. In putting the torpedo into action, in the first place its course and range have to be determined by the torpedo officer in charge in the usual manner with the necessary additions with reference to my invention. In Fig. 33 is shown a difficult course to be followed by the torpedo in striking a vessel at anchor in a secure harbor. The officer in charge, therefore, in order to make the torpedo follow these courses, would proceed as follows: He would ship the handle on the right side of Fig. 2 into socket 72 and turn it once and three-quarters. He now unships his handle and ships it in 72 on the left and turns it two and one-half times to the right and turns it back one. He now unships the handle and ships it again in the former socket and turns it three and one-half times to the right and back one. He then ships it in the left socket, turns it four and one-half times to the right and back one. He then ships it into the other socket and turns it five and one-half times and back one. He then ships it in the opposite socket and turns it six and one-half times and back one. He then ships it in the opposite socket, turns it eight times and back one. He then ships it into the opposite socket, turns it eight and one-half times and back one. He then ships it in the opposite socket, turns it nine times and back one. He then ships it in the opposite socket, turns it nine and one-half times and back one. He then ships it in the opposite socket, turns it ten times and back one. He then ships it in the opposite socket, turns it ten and one-half times and back one. He then ships it in the opposite socket, turns it eleven times and back one. He then ships it in the opposite socket, turns it eleven and one-half times and back one. He then ships it in the opposite socket and turns twelve times and back one. He then ships it in the opposite socket, turns it twelve and one-half times and back one, and thus nineteen courses have been set for their respective distances. Now he rams his torpedo in the tube and when the shaft 33' is just inside the tube he ships the service handle in 24 and moves it to the left which allows the upper part of 33' to rest against the inner side of the torpedo tube and when the impulse charge is fired, either of compressed air or four and one-half to six and one-half ounces of powder, by the officer in charge, the torpedo moves forward toward the outer end of the tube and when 19 clears the mouth of the tube the controller springs up out of its watertight compartment opening the starting valve and the torpedo plunges into the water. By this time, the propellers, having no resistance while passing through the air, have made fifty-six revolutions which throws open the delay action valve and this occurs just about the time that the torpedo is submerged. She now proceeds on in the direct course and if any transverse currents, such as shown in Fig. 34, should deflect the torpedo from its direct course, it is clear that as the head of the torpedo is pressed over to starboard or port, the stern is pressed over in the reverse direction and hence the controller is forced over in the same direction in which the head of the torpedo is being forced; for instance, head forced to port, controller forced to port, helm aport, torpedo back to her course. Head of torpedo forced to starboard, controller forced to starboard, helm forced to starboard and torpedo back to her course again. When the torpedo has run its determined course in a straight line the motion box takes control of the rudder according to the setting previously described and the torpedo is deflected to port or starboard as may be determined. It is important, of course, that the time of the deflection of the rudder to port or starboard shall be only so long as to turn the torpedo at right angles to its previous course. This is a matter easily determined by making the parts of proper size so as to hold the helm to port or starboard for the required number of revolutions of the driving shaft. In case it is desired, however, to stop the torpedo at a given distance, the handle is inserted in the keyed shaft 108, Fig. 3, and for a course of say, five hundred yards, one turn advances lever 101, Fig. 9, to the required position and when the motion box reaches the proper position lug 102 forces arm 98 over into the dotted line position and closes the stop valve and the power is shut off from the reduction valve and engines and the torpedo stops. If, however, it is desired that the torpedo shall turn on its own tactical diameter, as shown in Fig. 35, at a desired point in its course, then the pin 36 is dropped into its socket and the handle in the socket 72 is turned the desired number of times to correspond to the distance at which it is desired the torpedo shall begin to circle. Then when the helm is set to port or starboard as the case may be, it will continue in that position until it is released by the action of the motion box, as previously described, which can be at any point of the course subsequent to the setting of the helm within the range of the torpedo. If desired, the torpedo will continue to circle until its energy is expended. A number of torpedoes can be similarly put in action, as shown in Fig. 36, thereby blockading the entrance to a harbor. It may be seen that this mechanism can, if desired, be set to close an electric circuit and so work electromagnets and armatures to throw the tiller to starboard or port. But, as any kind of electricity and especially storage batteries, are very unreliable when in action on the water from short circuits and other well known causes of failing to act when necessary, I prefer to use purely mechanical movements in carrying out the required results and purposes of my invention.

What I claim as my invention and desire to secure by Letters Patent is—

1. An automobile torpedo provided with adjustable setting mechanism for automatically shifting the helm to starboard or port at predetermined points in the course, and means for temporarily locking the helm after shifting.

2. An automobile torpedo provided with adjustable setting mechanism for automatically shifting the helm to starboard or port at predetermined points in the course, means for temporarily locking the helm after shifting, and means for controlling said mechanism.

3. An automobile torpedo provided with mechanism for automatically setting the helm to starboard or port, at predetermined points in the course of the torpedo, and with a controlling vane connected with the rudder, substantially as set forth.

4. An automobile torpedo provided with mechanism moving as the propeller shaft revolves and mechanism for connecting the same at a predetermined point or points with the steering mechanism of the torpedo, substantially as described.

5. An automobile torpedo having an advancing mechanism comprising a motion box moving with the rotation of the propeller shaft and with mechanism for opening the controlling valve of the torpedo and with further mechanism for operating the controlling valve of the torpedo, the said advancing mechanism or motion box operating first to open the controlling valve of the torpedo and secondarily to close the controlling valve at a predetermined point, substantially as described.

6. An automobile torpedo provided with mechanism moving during the rotation of the propeller shaft and including devices for operating the rudder to starboard or port at predetermined points and with mechanism for locking the rudder when so shifted, substantially as described.

7. An automobile torpedo provided with mechanism moving during the rotation of the propeller shaft and including devices for operating the rudder to starboard or port at predetermined points, with mechanism for locking the rudder when so shifted and with mechanism for releasing the rudder from the locking means after a predetermined number of revolutions of the propeller shaft, substantially as described.

8. In an automobile torpedo, steering mechanism including a rudder and means for controlling the movements thereof; and means operating in conjunction with the last-named means for holding the rudder over and causing the torpedo to circle on its tactical diameter at a predetermined point in its course.

9. An automobile torpedo provided with mechanism for automatically setting the helm to starboard or port, with a supplemental steering vane located within the shell of the torpedo when the latter is inactive, and means for causing the projection of the vane from the shell of the torpedo at the inception of the activity of the latter.

10. An automobile torpedo constructed with a motion box, means for moving the motion box in proportion to the revolutions of the propeller, steering mechanism, a plurality of toes provided on the motion box for engagement with the steering mechanism at predetermined points, and means for setting each toe to be operative or inoperative with respect to the steering mechanism.

11. An automobile torpedo provided with a rudder and with two or more time release locks coöperating therewith, with mechanism for independently setting the time release locks, whereby the rudder is locked to starboard or port and with a motion box having mechanism for operating the locks to release the rudder.

12. In an automobile torpedo, steering mechanism and an advancing motion box having means for operating the steering mechanism, in combination with a worm, a worm sleeve associated with the motion box and engaged with the worm, a spur wheel mounted on the worm and a propeller shaft having a toe for intermittently engaging the spur wheel.

13. In an automobile torpedo, the combination with steering mechanism and an advancing motion box having means to produce predetermined operations of the steering mechanism, of a propeller shaft and connections between the propeller shaft and the motion box to produce a step-by-step advancing action of the latter.

14. In an automobile torpedo, an exterior controlling vane 19 having at its lower and interior end a controller shaft arm 34, in combination with a tiller and intermediate mechanism connecting the tiller and the arm and working internally to throw the external rudders to starboard or port, substantially as described.

15. In an automobile torpedo, a screw sleeve having a thread in which each turn represents a definite distance of travel; mechanism connected therewith to bring the rudders into action at predetermined points, rudder operating connections operated by the mechanism, and means coöperating with the screw sleeve to produce the operation of the mechanism.

16. In an automobile torpedo, a torpedo body, a rudder, tiller mechanism arranged within the body and operatively connected to the rudder, and a controller vane arranged outside of the body and having a connection which extends through the body and is operatively associated with the tiller mechanism, the body having a compartment, watertight as to the interior of the body, and into which the controller vane may be retracted when the torpedo is inactive.

17. In an automobile torpedo, a rudder, a plurality of devices which may be set to produce a determined sequence of port or starboard shifting operations of the rudder, and means movable relatively to the devices and having parts for engagement with the devices which have been set to produce the operation of said devices in the order and sequence determined.

18. An automobile torpedo including a body, a rudder exteriorly associated therewith, tiller mechanism arranged within the body and operatively connected to the rudder, yieldable means for holding the tiller mechanism in a normal position, a controller vane arranged outside of the body, and operative connections between the controller vane and the tiller mechanism.

19. In an automobile torpedo, mechanism for operating an external rudder, an advancing motion box having a tripping toe for coöperation with the mechanism and a propeller shaft driven feed mechanism for advancing the motion box.

20. In an automobile torpedo, a controller vane and a starting valve, in combination with mechanism for projecting the vane from the body of the torpedo and intermediate mechanism operable consequent to the projection of the vane for opening the starting valve.

21. In an automobile torpedo, in combination, an external rudder, a propeller shaft, tiller mechanism, an advancing motion box, a graduated screw driven by the propeller shaft for producing the movement of the motion box, devices operating in conjunction with the motion box for producing determined operations of the tiller mechanism, an external controller vane, and connections between the controller vane and the tiller mechanism.

22. In an automobile torpedo, in combination, a rudder, tiller mechanism having means for holding the rudder in a normal position and two mechanisms operating in conjunction with the tiller mechanism for producing independent operations of the rudder, the one mechanism including an external controller vane and connections between the same and the tiller mechanism, and the other mechanism including a motion box and devices operating in conjunction therewith for producing predetermined operations of the rudder.

23. In an automobile torpedo, rudders, operating connections therefor, an advancing motion box, devices carried by the motion box to engage the connections, in successive order, and to produce the operation of the rudders, the devices being adjustable to be operative or inoperative with respect to the rudders, a propeller shaft, a screw feed mechanism for advancing the motion box and operative connections between the screw feed mechanism and the propeller shaft.

24. In an automobile torpedo, a propeller shaft, a motion box advancing in proportion to the revolution of the propeller shaft, a valve having delay action and stop operations, and two sets of mechanisms operated by the motion box, the first producing the delay action operation of the valve, and the second producing the stop operation of the valve.

25. In an automobile torpedo, a controlling valve having starting, delay action, and stop operations, a shaft having means for producing the three operations aforesaid and having also a vane, and mechanisms coöperating with the vane for moving the shaft and thereby producing the operations of the valve.

26. In an automobile torpedo, the combination with a steering rudder of port and starboard operating connections therefor, an advancing motion box having means to successively engage the connections at predetermined points, a propeller shaft, operative connections between the propeller shaft and motion box to produce the advancing movement of the latter, time lock mechanism for holding the rudder in the positions into which it has been shifted, and means operated with the motion box for operating the time lock mechanism to release the rudder.

27. In an automobile torpedo, the combination with a steering rudder of port and starboard operating connections arranged successively in advance of one another, a motion box having devices to engage the connections and to produce the operation of the rudder, means for setting each device to be operative or inoperative with respect to the connections, and means for causing the advance of the motion box continuously with the movement of the torpedo.

28. In an automobile torpedo, a rudder, devices which may be set to produce a determinate order and sequence of port or starboard rudder shifting operations, and propeller shaft driven means for coöperation with those of the devices which have been set.

In testimony whereof I have signed this specification in the presence of two subscribing witnesses.

J MORRIS O'KELLY.

Witnesses:
  GEO. W. JAEKEL,
  FRANK E. RAFFMAN.